(12) United States Patent
Bodley et al.

(10) Patent No.: US 7,130,419 B2
(45) Date of Patent: Oct. 31, 2006

(54) HEADSET COMMUNICATION UNIT

(75) Inventors: Martin Reed Bodley, Sudbury, MA (US); Ian Paul Smith, Merrimack, NH (US); Stephen R. Lyman, Hudson, NH (US); Christian Bjerrum-Niese, Copenhagen (DK); Paul Wojciak, Merrimack, NH (US); Charles L. Pederson, Virum (DK)

(73) Assignee: GN Netcom, Inc. (DK)

( * ) Notice: Subject to any disclaimer, the term of this patent is extended or adjusted under 35 U.S.C. 154(b) by 0 days.

(21) Appl. No.: 10/657,513

(22) Filed: Sep. 8, 2003

(65) Prior Publication Data

US 2004/0052362 A1 Mar. 18, 2004

Related U.S. Application Data

(62) Division of application No. 09/813,103, filed on Mar. 19, 2001.

(51) Int. Cl.
*H04M 1/00* (2006.01)
*H04M 9/00* (2006.01)
*H04B 1/38* (2006.01)

(52) U.S. Cl. .................... 379/430; 455/575.2
(58) Field of Classification Search ............... 379/430, 379/447; 455/90.2, 90.3, 575.2; 381/313, 381/370, 330, 381
See application file for complete search history.

(56) References Cited

U.S. PATENT DOCUMENTS

| | | | |
|---|---|---|---|
| 4,654,883 A * | 3/1987 | Iwata | 379/430 |
| 4,688,262 A * | 8/1987 | Schaefer et al. | 455/90.2 |
| 4,897,873 A | 1/1990 | Bentler et al. | 379/433.13 |
| 5,210,791 A | 5/1993 | Krasik | |
| 5,359,647 A | 10/1994 | Regen et al. | |
| 5,504,812 A | 4/1996 | Vangarde | |
| 5,708,724 A | 1/1998 | Burris et al. | 381/370 |
| 5,708,725 A | 1/1998 | Ito | 381/370 |
| 5,787,166 A | 7/1998 | Ullman | |

(Continued)

FOREIGN PATENT DOCUMENTS

DE 29808425 3/1998

(Continued)

OTHER PUBLICATIONS

Ericsson Bluetooth Wireless Headset, photo take from e-mobilecenter.com web site, May 8, 2002.

*Primary Examiner*—Benny Q. Tieu
(74) *Attorney, Agent, or Firm*—Altera Law Group, LLC

(57) ABSTRACT

Communication unit comprising a housing in which at least one transducer is placed, and on which a microphone arm is suspended. The housing also has means, such as an ear hook, for fastening the communication unit to the head of a user. The microphone arm is pivotally connected to the housing by a hinge link, and at an outer area of the housing, so that the microphone arm can be moved between a first position in which it lies up against the housing, and a second position in which it extends away from the housing. The microphone arm has a length, which in the main is less than or of the same order as the greatest extent of the housing, so that in the folded-in state the microphone arm does not project out over the circumference of the housing. The communication unit can be used on both the right and the left side of the head, in that the ear hook (6) can be suspended in two different positions, corresponding to the communication unit being worn on the right or the left ear, respectively.

7 Claims, 17 Drawing Sheets

U.S. PATENT DOCUMENTS

| | | |
|---|---|---|
| 5,793,865 A | 8/1998 | Leifer ........................ 379/430 |
| 6,016,347 A | 1/2000 | Magnasco et al. .......... 379/430 |
| 6,047,076 A * | 4/2000 | Yang .......................... 381/381 |
| 6,052,567 A | 4/2000 | Ito et al. ................... 455/575.7 |
| 6,055,312 A | 4/2000 | Pralus et al. ................ 373/430 |
| 6,230,029 B1 | 5/2001 | Hahn et al. ................. 379/430 |
| 6,269,259 B1 | 7/2001 | Lai |
| 2002/0110249 A1 | 8/2002 | Jeon et al. |
| 2002/0164042 A1 | 11/2002 | Vonlanthen ................. 381/313 |

FOREIGN PATENT DOCUMENTS

| | | |
|---|---|---|
| DE | 298 08 425 | 10/1998 |
| DE | 299 08 529 | 10/1998 |
| DE | 29908529 | 12/1999 |
| GB | 2105856 | 8/2002 |
| WO | 01/37524 | 11/2000 |

* cited by examiner

HEADSET COMMUNICATION UNIT

This application is a divisional of application Ser. No. 09/813,103, filed Mar. 19, 2001. This application is incorporated herein by reference.

TECHNICAL FIELD

1. Field of the Invention

The invention concerns a headset communication unit which comprises a housing in which at least one transducer is placed, and on which a microphone arm is suspended, said housing also having means for securing the communication unit to the head of a user. In the preferred construction, the headset is intended to be in wireless connection with some kind of other base unit, such as a cell phone, and communications would preferably follow the "Bluetooth" protocol. Of course, a person skilled in the art could modify the structure shown to make a wire connection with a base unit.

Such a communication unit is most often used in connection with telephony, where a telephone user who talks over the telephone often and/or engages in long telephone conversations, can use such a unit in the form of a headset or an earset without having to hold a handset. However, other uses also exist, such as in connection with mobile telephones and similar communication equipment.

2. Background

Examples of known headsets or earsets are described, for example, in U.S. Pat. No. 5,787,166 A and U.S. Pat. No. 5,504,812 A. These publications disclose both configurations, which are provided with a relatively long microphone arm, which means that both of these constructions are relatively space demanding when they are not being used. It is true that the microphone arm on the headset in the last-mentioned publication can be turned upwards, so that it lies parallel with the housing and the head-piece, and whereby at the same time a switch function is activated, but still this known headset will be of considerable dimensions. It will thus not be expedient for users to transport these known headsets around with them when the headsets are not in use, the reason being that they cannot be placed in a pocket, a bag or the like without great difficulty.

A further earset is also known from DE 299 08 529 U, where the earset is configured as a round capsule with an ear hook and a relatively long microphone boom, this boom being configured in a flexible material. This microphone boom is wound up inside the capsule, from which it can be drawn out when it is to be used. Due to the flexible nature of the microphone boom, a precise positioning of the microphone and herewith an optimum sound reception can hardly be expected and, moreover, the microphone boom will easily be susceptible to physical influences.

Finally, a communication unit of the kind disclosed in the preamble is known from DE 298 08 425 U, which describes a wireless earset. This known earset has a housing in the form of an ear shell which at its uppermost part has a projecting antenna, and which at its lower part has a microphone arm. This microphone arm consists of two link stays, which are hinged to each other. The one link stay supports a microphone at its free end, while the other link stay is secured to the housing in a pivotal and displaceable manner. When the earset is not in use, the microphone arm can be inserted into a guide in the housing, in that the two link stays are first folded together by a turning of the one link stay, so that the two link stays lie over each other, after which they are turned so that they lie in line with the guide, after which the link stays can finally be pushed into the guide in the housing.

BRIEF SUMMARY

What this known microphone arm thus involves is that it consists of a relatively complicated and herewith also a vulnerable mechanism, which comprises two hinge links and a linear guiding movement and herewith subsequent risk of damage during use. Moreover, the users of this known earset must make themselves familiar with a relatively complex procedure for taking the earset into use and its adjustment, in that the microphone arm must first be slid out of the guideway groove, after which the two link stays must be folded out, and finally after which a suitable position of use must be set by adjustment of the two hinges, i.e. partly the hinge between the two link stays and partly the hinge between the second link stay and the housing.

It is thus an object of the invention to provide a communication unit which, when it is not in use, only occupies very little space, which is easy to use, also for a user who is not familiar with the communication unit, and which is of a robust and operationally reliable construction.

This is achieved in that the communication unit disclosed in the preamble is configured such as disclosed and characterised in claim 1, in that the microphone arm is connected by a hinge link in a pivotal manner to and at an outer area of the housing, so that the microphone arm can be moved between a first position in which it lies up against the housing, and a second position in which it extends away from the housing, and that the microphone arm is of a length which is substantially less than or of the same order as the largest extent of the housing.

It is hereby achieved that in the first position, the microphone arm will not project outside the extent of the housing, but will lie up against and coincide with this, so that in its unused state the communication unit will not occupy a particularly great deal of space and, furthermore, it can easily be kept for example in a drawer, in a bag, in a pocket or other similar places. Moreover, with the disclosed configuration a relatively simple and robust hinging of the microphone arm to the housing is achieved, since what is involved is merely a single hinge link, so that the microphone arm can be folded out to the position of use in a simple manner.

With the embodiment as disclosed, use is made of a particularly expedient hinging of the microphone arm to the housing, in that the microphone arm hereby moves in a plane which stands substantially at right-angles to or at an obtuse angle in relation to a side plane for the housing. The hinging can hereby be configured as a particularly robust construction. For example, it can be configured as disclosed, by which embodiment it is achieved that the movement of the microphone arm is guided in an especially good manner, and that the hinging will be resistant to influences arising externally, such as shock, impact, jolting and the like.

As disclosed, it can be expedient for a switch arrangement to be associated with the movement of the microphone arm, which can be used, for example, for coupling the communication unit electrically when the microphone arm is folded out, and conversely for switching off the communication unit when the microphone arm is folded in against the housing. This will be an advantage especially when the communication unit functions in a wireless manner, in that here it is especially necessary to prevent unnecessary current consumption, which can be achieved precisely with the disclosed configuration, where the current consumption will be cut off when the microphone arm is folded in, e.g. when it is taken off the user's head. It will thus not be necessary for the user to have to remember to switch off the communication unit by operating a separate switch button.

With a particularly expedient embodiment, such as disclosed, a lock- or safety arrangement can be associated with the microphone arm. It can hereby be ensured that the microphone arm will not unintentionally be moved away from the folded-together state, e.g. while it is being kept in a pocket, a bag, the glove compartment of a car or similar places of storage, which could otherwise have the effect that it will consume current, which as mentioned is a disadvantage, especially in connection with wireless configurations. The release arrangement can consist of a purely mechanical device which secures the microphone arm, and which when activated results in the fact that the microphone arm can be folded out. At the same time herewith, the microphone arm can thus activate a switch arrangement as mentioned above. However, the release arrangement can also consist of a mechanical device, which at the same time is coupled to a changeover switch or contact, so that an activation of the release arrangement not only releases the microphone arm but also couples the electrical circuits. Finally, the lock- or safety arrangement can consist of a bi-stable construction of the microphone arm and its suspension, so that the microphone arm, e.g. against a spring pressure, must be forced or moved away from the two stable positions, for example the fully folded-in and the fully folded-out position. It is not until the passage of an unstable point that the movement of the microphone arm becomes easier or possibly completely influenced, e.g. by a spring force, towards the second of the two stable positions. In this way it is similarly ensured that the microphone arm is not unintentionally moved away from the in-active state.

As characterised in the claims, the communication unit can contain a microphone which can be placed either in the housing or in the microphone arm, in which latter case the electrical connections to a microphone built into the microphone arm can expediently be effected via the hinge link, in that parts of the hinge can possibly constitute or support electrical connections.

Furthermore, the communication unit can expediently be configured as disclosed, whereby in connection with a wireless embodiment an antenna is established in association with the housing or in association with the microphone arm, so that it is avoided that a fixed antenna will project outside the extent of the housing when the communication unit is not in use. As disclosed, the antenna can expediently consist of a coating on a surface in or on the housing or the microphone arm, for example on a side of the microphone arm, whereby a suitable antenna can be established in a relatively simple manner.

As disclosed, the electrical connection to the antenna can be effected via the hinge link, for example by means of an electrically conductive coating on the hinge parts which abut up against each other or lie against each other in the position of use.

Moreover, means for the securing of the communication unit, such as disclosed, can consist of an ear hook, an ear ring or the like, which is connected to the housing in such a way that it can be turned out from the housing, so that the ear hook or ear ring can easily grip around behind the ear when the communication unit is placed against the outer ear. When not in the position of use, the ear hook or the ear ring can also be turned in towards the housing where it can be disposed in a cut-out or recess, so that neither the ear hook nor the ear ring will project substantially outside the extent of the housing in the unused state. Thus, neither the means for securing the communication unit on the head of the user will constitute any hindrance to an easy storing of the communication unit in, for example, a pocket, a bag or similar places when it is not in use.

Finally, the communication unit can be configured as disclosed, so that there is free choice whether the communication unit is to be worn on the right or on the left ear, in that the user can carry out a changeover to the position in which the communication unit is desired to be worn in a relatively simple manner.

BRIEF DESCRIPTION OF THE DRAWINGS

In the following, the invention will be described in more detail with reference to the drawings, where.

DETAILED DESCRIPTION OF THE INVENTION

Figure 1:
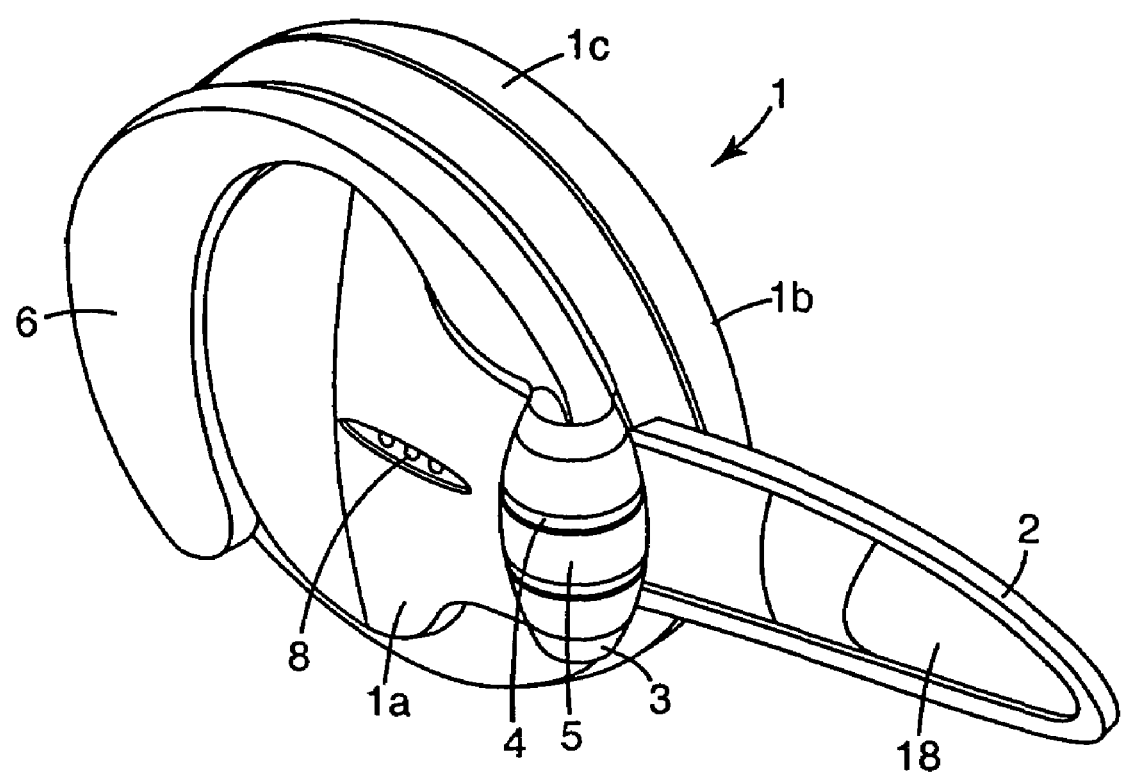
FIG. 1 shows an embodiment of the invention seen in perspective.

An embodiment of a communication unit according to the invention is shown in perspective and in its state of use in FIG. 1, and as will be seen the unit consists of a housing, which is indicated in general by the reference FIG. 1. This housing is configured as a flat capsule with slightly convex side surfaces, i.e. an inner side surface 1a and an outer side surface 1b, and with an annular edge surface 1c, which is similarly slightly convex. The extent of the side surfaces of the housing is of the same order as or less than an ear, so that the housing can easily be worn by a user without any inconvenience.

A microphone tongue or microphone arm 2, as it is also called in the following, is extending out from the housing, and this microphone arm is secured to the housing by means of two hinge pins 3 and 4 which are integrated parts of the housing 1, and which extend from the side surface 1a in the vicinity of the edge surface 1c or in the interface area between these two surfaces. Between the two hinge pins 3 and 4 a hinge part 5 of the microphone arm 2 is disposed, so that the microphone arm can be turned approx. 180° in towards the housing 1. As shown, the microphone arm 2 has openings 7, so that a transducer such as a microphone, a sound tube or the like in the microphone arm 2 can receive audio signals. When the transducer placed in the microphone arm is a sound tube, and which carries the audio signals further, these signals can possibly be fed further to a transducer such as a microphone, which is placed in the housing 1. As shown, the openings 7 are preferably configured in that side of the microphone arm 2 which faces away from the face of the user when in the position of use, whereby a suitably high accessibility is achieved for the audio signals to the transducer in the microphone arm 2.

Figure 7:
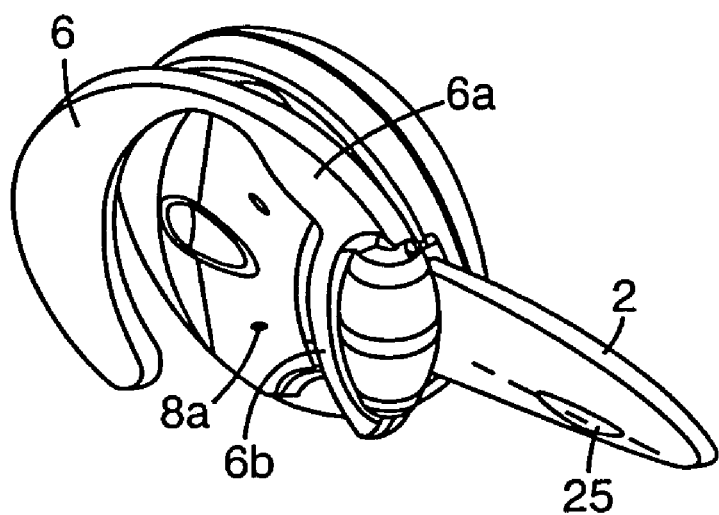
FIG. 7 is a view like FIG. 3 except in an alternate embodiment
Figure 8:
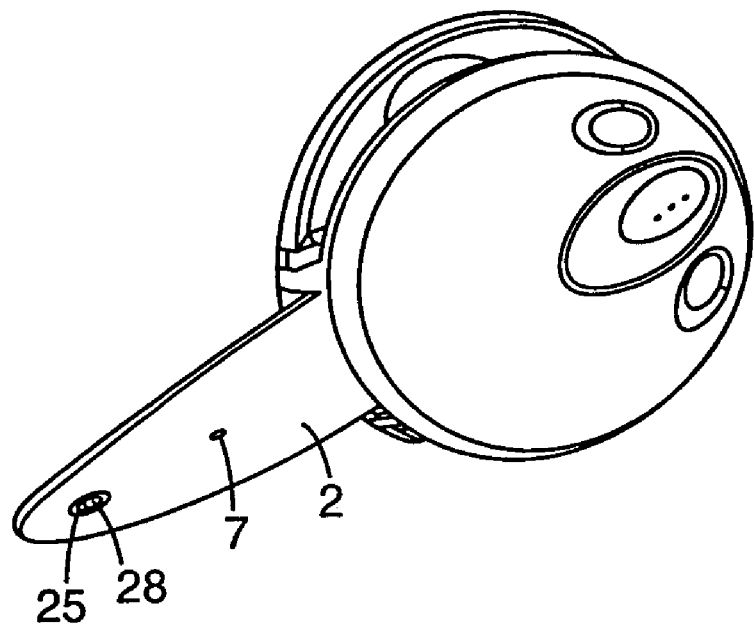
FIG. 8 is a side perspective view of the subject matter in FIG. 7.
Figure 9:
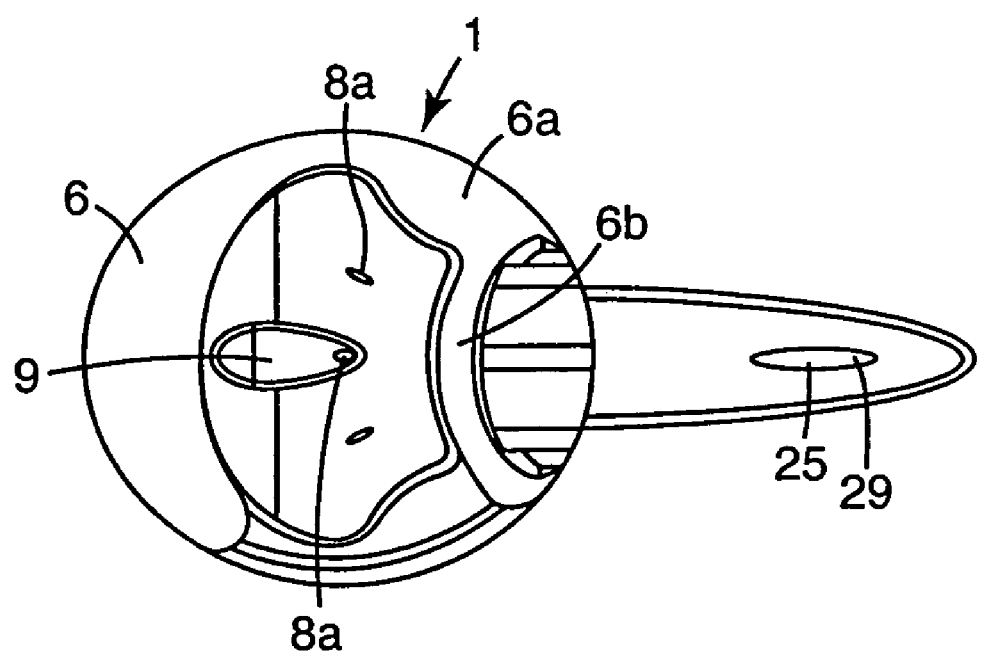
FIG. 9 is a side plan view of the subject matter in FIG. 7.
Figure 10:
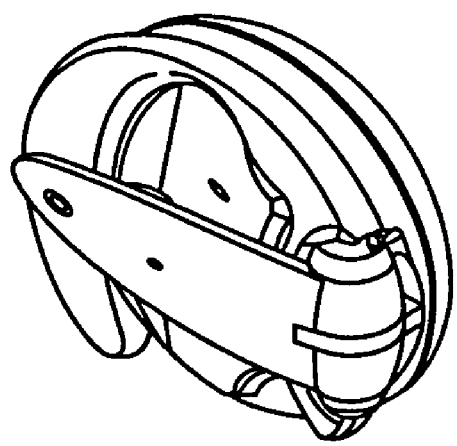
FIG. 10 is a perspective view like FIG. 7 except that the microphone boom and earhook are in their closed/stowed position.

Moreover, an ear hook 6 is secured to the housing 1, in that this ear hook can be secured to the housing in a pivotal manner by means of the hinge pin 4. The ear hook can thus be turned at an angle out from the side surface 1a, so that the communication unit can be placed on the ear of a user. Finally, it will be seen in FIG. 1 that in the side surface 1a openings 8 (8a in FIG. 7, and 9 in FIG. 9) are provided, which stand in connection with a transducer or loudspeaker in the housing 1.

Figure 2:
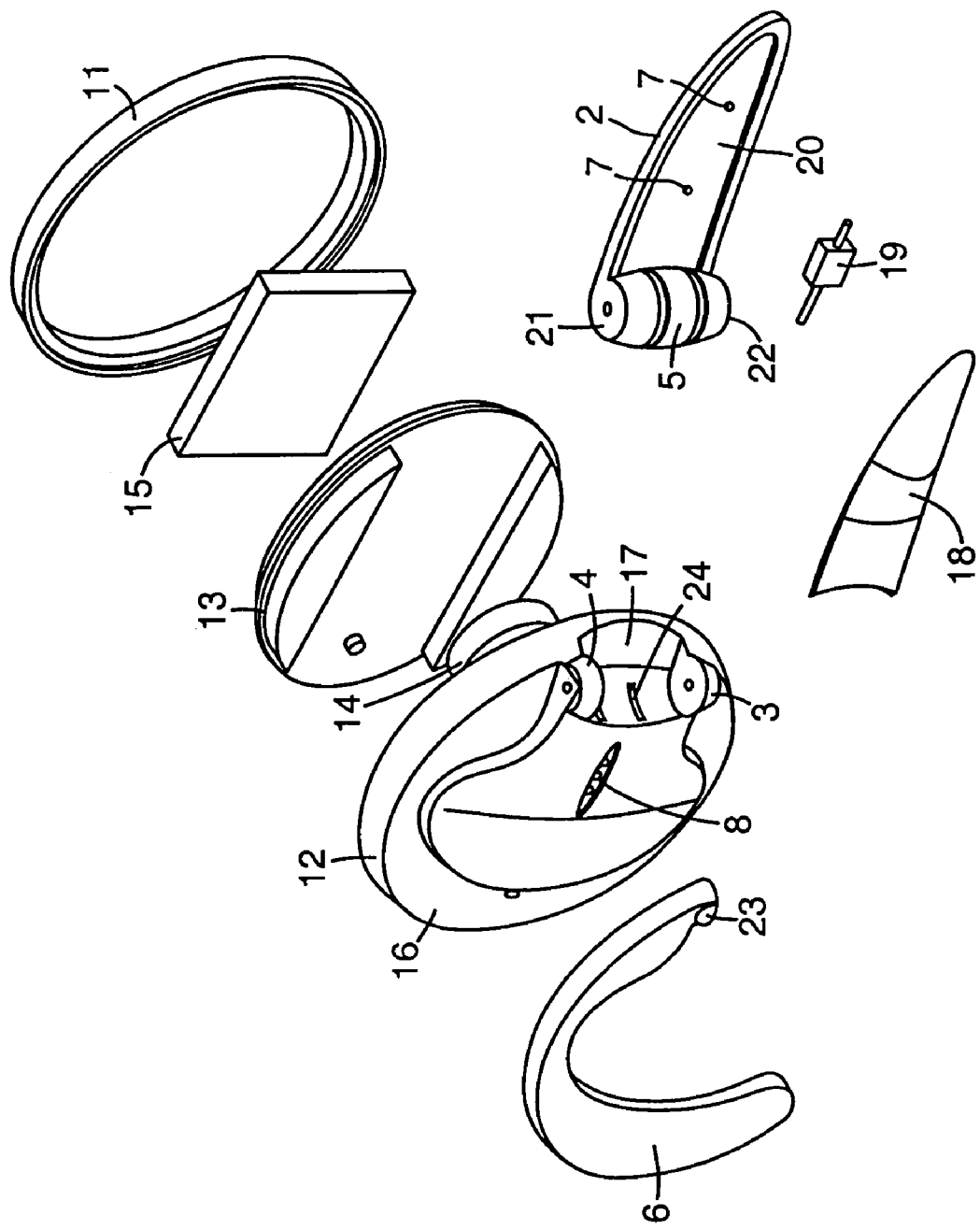
FIG. 2 shows an exploded, perspective view of a second embodiment of the invention on a smaller scale.
Figure 3:
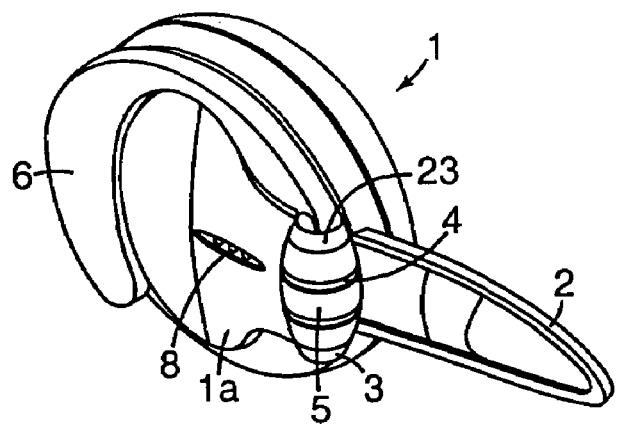
FIG. 3 shows an assembled version of the embodiment shown in FIG. 2, but similarly in perspective.

FIG. 2 shows an exploded view of a communication unit according to the invention on a slightly smaller scale and of a slightly changed embodiment. As will be seen, the housing is made up of two shells, i.e. an outer shell 11 and an inner shell 12. Between these two shells an intermediate plate 13 is placed, which can support electrical circuits and components. A transducer 14 is placed between this plate 13 and the inner shell 12, and a battery 15 is placed on the other side of the intermediate plate 13. Components other than those shown or described can naturally be placed in the same manner on or between the shells and the intermediate plate. Similarly, in or on the housing 1 an antenna (not shown) can be placed for use in the wireless transmission of signals to or from the communication unit. This antenna can be placed on a print board in the housing 1 or can be configured as an electrically conductive coating on another part of the housing, for example on the inner side or the outer side of the outer shell 11 or the inner shell 12.

The battery 15 can be one of several different battery types. However, this will mainly involve primary cells or batteries built up of primary cells, which will thus have to be replaced, or use can be made of secondary cells or secondary batteries, which will thus have to be recharged, which can be effected in various known ways.

The batteries involved can also be of the kind, which, depending on the constructive configuration of the housing 1, can be categorised as replaceable or as built-in. In the first case these can be batteries or cells which cannot be recharged, but which can be replaced directly by the user, e.g. via a commonly-known battery cover or battery flap, or they can be rechargeable batteries which can he removed by the user for charging in a battery charger. In the latter case, i.e. with built-in batteries, these can be of the type which are not rechargeable, and which cannot be replaced directly by the normal user, but which must be replaced e.g. during a service inspection, whereby it is ensured that the communication unit receives regular service. Alternatively, the battery can be of a rechargeable type, which is recharged e.g. by means of a plug connection or by means of electromagnetic energy transfer.

Finally, while making use of different types of materials, the battery 15 can be configured for the electrically active components. For example, use can be made of NiCd batteries, NiMH batteries, Li-ion batteries or Li-polymer batteries. The selection can be made especially with regard to energy content per volume, in that it is important out of regard for the confined conditions inside the housing 1 to make use of a battery, which with a given energy content has a minimum size. Similarly, it can be expedient to use batteries such as e.g. Li-polymer batteries which are flexible in form, and which can be adapted to a given shape, so that the choice is not restricted to conventional battery shapes, whereby the placing in the housing 1 can be effected more easily and expediently while retaining a desired small volume.

Figure 11:
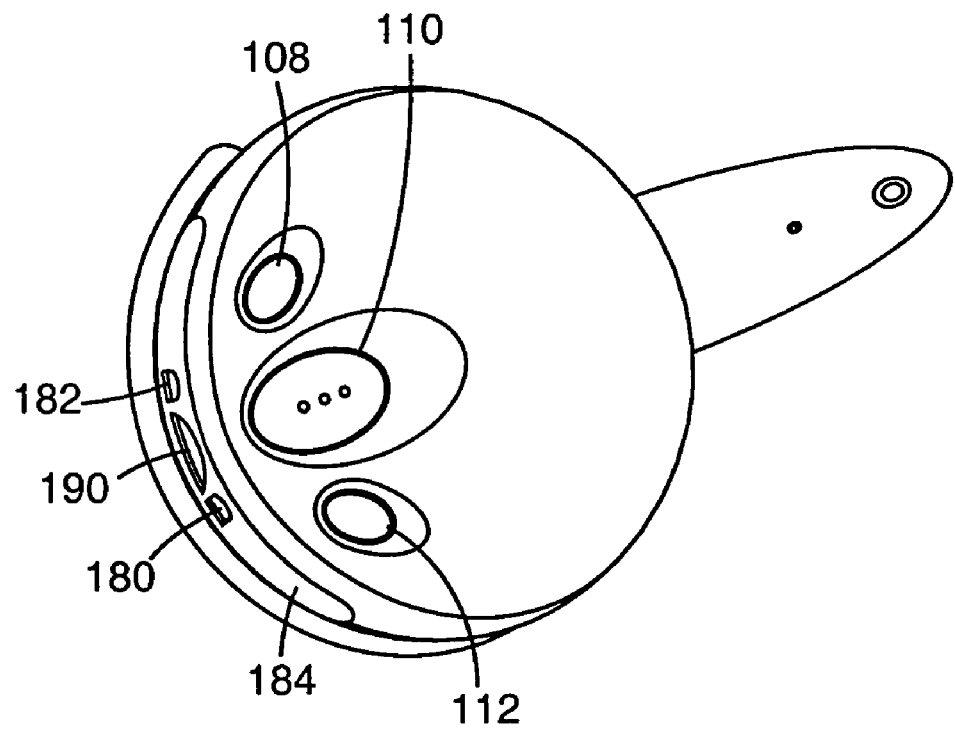
FIG. 11 is a perspective view like FIG. 8, but with a further embodiment

While battery charging is considered safe, as an extra measure of safety, the circuitry may be configured to prevent battery operation when the battery charger is inserted into the charging port 190 (FIG. 11). This interlock on the charging port can be achieved by detecting the present of current from into the receptacle.

Along the edge in the inner shell 12 a depression or recess 16 is provided, which in shape corresponds to the ear hook 6, and between the two hinge pins 3 and 4 there is a depression 17, which corresponds to the shape of the hinge part 5 on the microphone arm 2.

As shown, the microphone arm 2 has a shell part 18, which is mounted against the inner side 20 of the arm, in which inner side the two apertures 7 open out. The shell part 18 serves to form a compartment in which a transducer 19 such as a microphone or a sound tube can be accommodated. Moreover, in the cavity in an embodiment of the invention an antenna can be provided, which can be configured as metal or other electrically suitable coatings (not shown) on the inner side 20 of the microphone arm. The electrical connection from the antenna to the electrical circuits in the housing 1 can be effected via the hinge parts 3, 4 and 5. Electrical conductive coatings can thus be provided on the axial end surfaces 21 and/or 22 of the hinge part 5, and on the corresponding surfaces on the hinge pins 3 and 4, so that the necessary electrical connection is achieved when the hinge is assembled. Finally, there will be electrical connections from the microphone 19 to the housing 1, which can be achieved by means of flexible conductors which are led via the hinge, e.g. via the annular recesses shown on the hinge part 5, or by means of other forms of connections, for example spring or slide contacts between the housing 1 and the microphone arm 2.

Because of the relatively short length of the microphone arm, the microphone unit 19 placed in the microphone arm 2 can expediently be configured as a unit with a high degree of directivity, for example so that audio and speech signals from the mouth of the user are intercepted by the microphone, whereas sounds which come in from other directions are not registered or are intercepted only to a lesser degree.

An alternative construction an attachment of the boom/mic arm 2 is shown in figures.

The ear hook 6 is further configured with a securing part 23 which, for example, consists of a pin or the like which can enter into engagement with a corresponding socket part in the upper hinge pin 4, so that the ear hook 6 can be turned through an angle. The ear hook 6 can in the same way be secured to the lower hinge pin 3 by means of the securing part 23, and in this position the ear hook can also be accommodated in the recess or the depression 16. The communication unit shown can thus be used for both the left and the right ear of the user, in that depending on the use for either the left or the right ear, the ear hook 6 can be placed respectively on the upper 4 or the lower 3 hinge part shown in FIG. 2. As will be seen, the microphone arm 2 and the remaining eternal parts of the communication unit are configured in a substantially symmetric manner around a centre plane, so that the communication unit can be used for placing both on the left or the right ear, solely by changing the ear hook 6 from the upper mounting to the lower mounting or vice versa.

The construction of the earhook and its connection to the body is shown in an alternate form in FIGS. 7–10, where the earhook 6 includes a connecting element 6*a* and a bridge element 6*b*.

Furthermore, in this embodiment, an indicator window 25 allows light passage of a diode 28 which provides display functions as explained elsewhere herein. On the same side of the boom is an air vent 7 which improves the acoustical performance of the system.

On the inner side of the boom 2 is an aperture 29 which receives a microphone boot 25, which is discussed in later figures.

Figure 16:
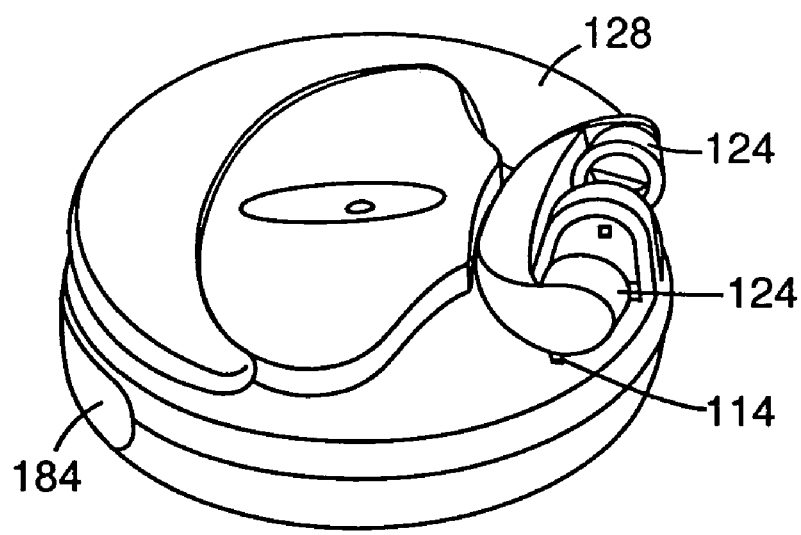
FIG. 16 is a perspective view, with portions removed, of the subject matter in FIG. 12.
Figure 17:
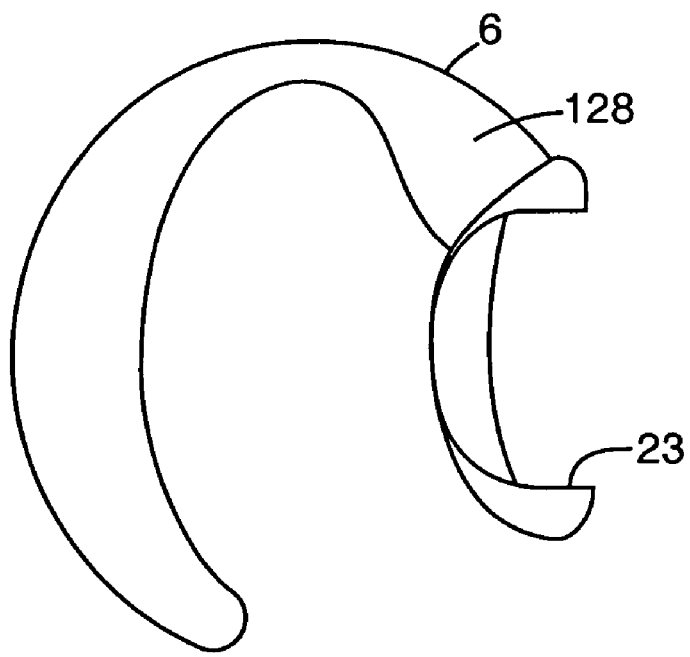
FIG. 17 is a side plan view of the earhook from FIG. 12.
Figure 24:
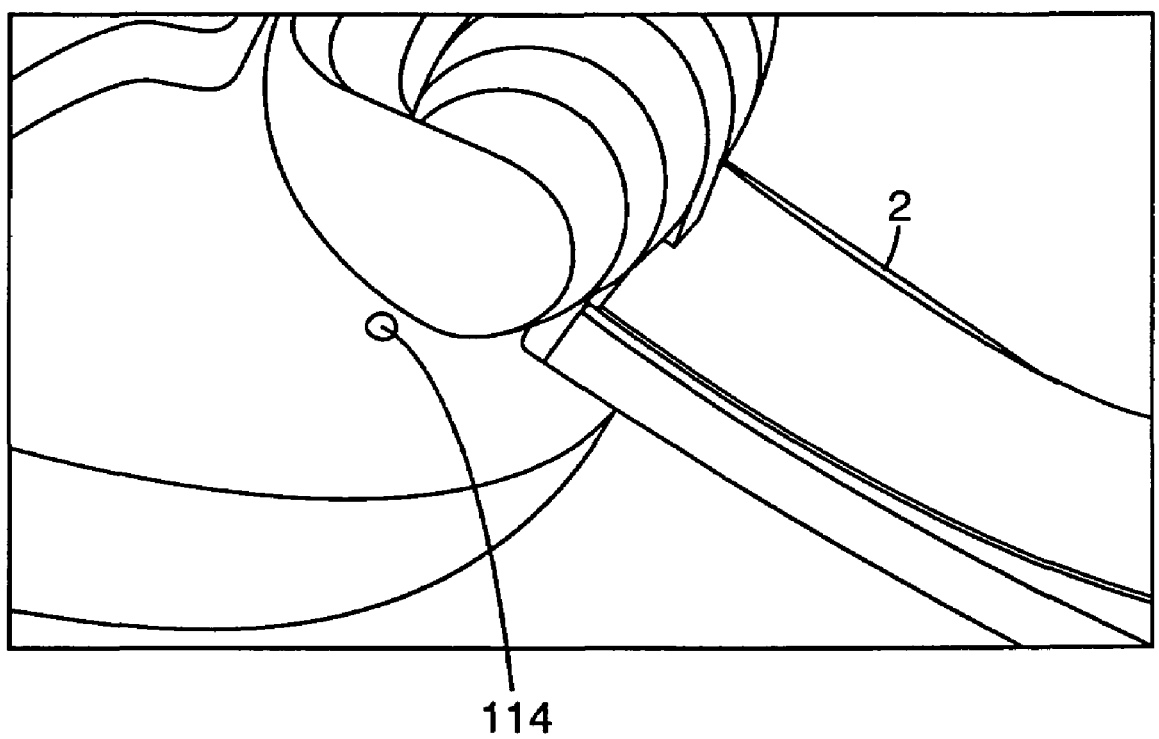
FIG. 24 is a close up perspective view of the hinge and earhook of FIG. 2.
Figure 25:
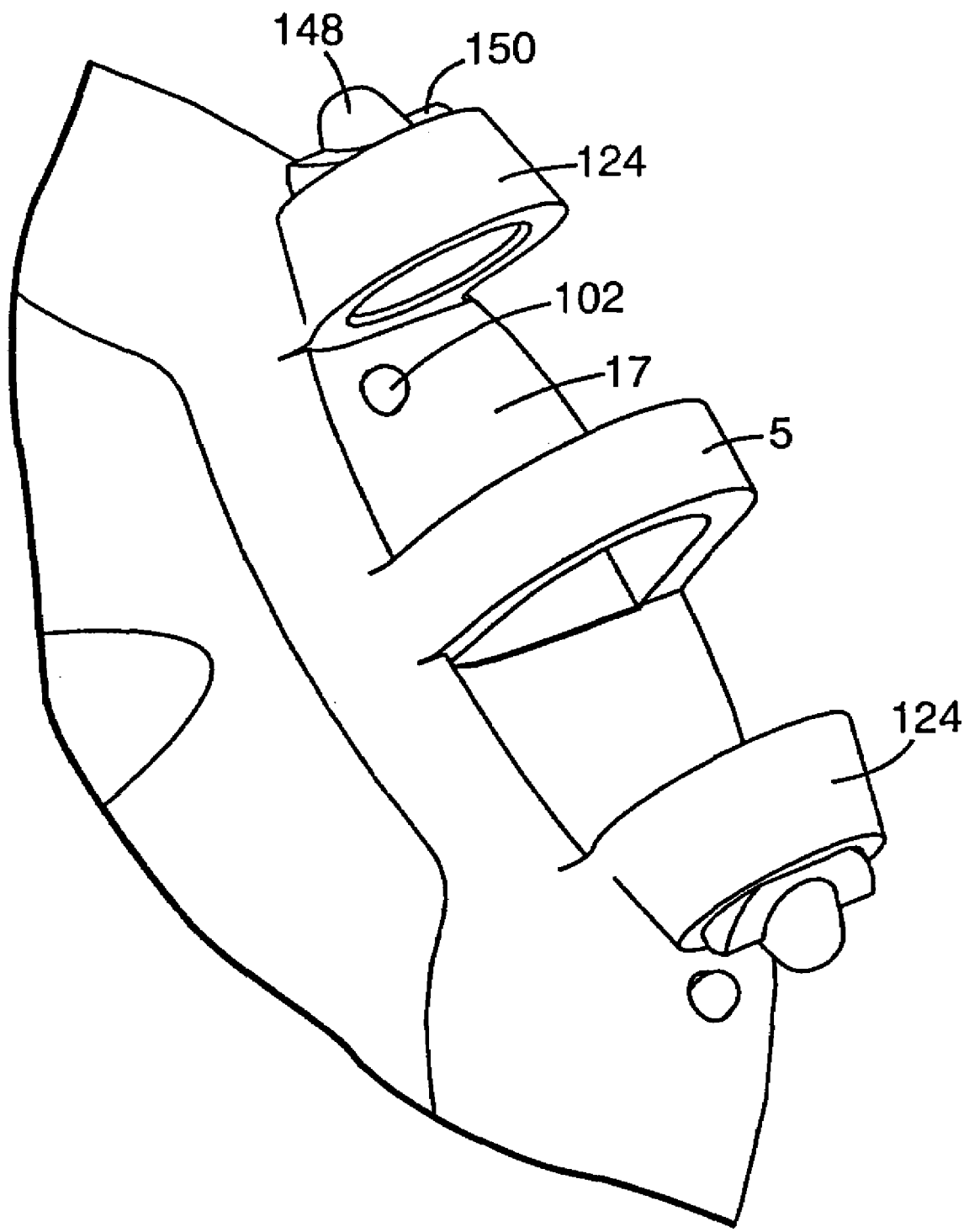
FIG. 25 is a close up perspective view of the hinge in FIG. 24, with the boom and earhook removed.

One complication with changing earhook 6 from right and left sides is that control buttons 108, 110 and 112, (FIG. 11) which are used for various electronic functions (such as volume, Bluetooth linking, etc,) will necessarily be upside down of their positions when the earhook is reversed to the other side. To avoid confusing the operator, and keeping consistency in the arrangement of buttons, the system has means to detect which ear the user is wearing the device. This is done indirectly by detecting the position of the earhook, rightside up or upside down. A switch 114 (FIG. 24) is situated on the housing 1 adjacent the hinge pins 124 (FIGS. 16 and 25). Notice that securing parts 23 which mate with pins 124 but do not occlude the switch 114 (FIG. 16). However, the configuration of extension 128 (FIG. 17) will occlude the switch when it is in the correct orientation. Alternatively, one of securing portions 23 can be made slightly larger than the other to insure that the switch 114 will always be actuated when the larger securing portions 23 overlies the switch, thereby translating to the left or right ear of the user. Thus, mere switch of the earhook will send a signal to the unit to reverse the orientation of the button 108–112 and could also control other functions (like increased volume for a user with unequal hearing in one ear, etc).

It will be appreciated that the other mechanical or electronic means can be used to achieve this result. A proximity detection system, a gravity detection system or any other means for knowing the orientation of the body 1 will tell the system which ear is being used.

Figure 12:
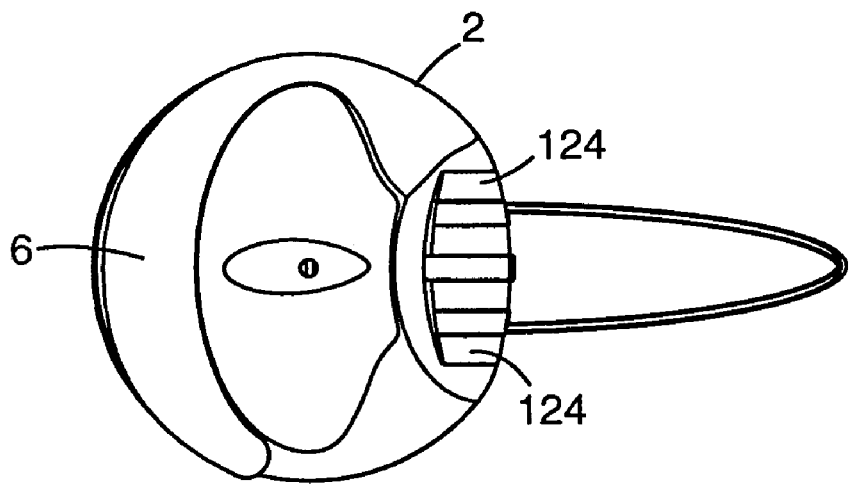
FIG. 12 is a side plan view of the subject matter of FIG. 11

To insure that the earhook 6 collapses against the body 1 and remains there when not in use, the earhook includes a deeper recess 146 (FIG. 16) and a shallower recess 144 in at least one securing part 23. On the body, is a mating set of deeper pins 148 (FIG. 25) and shallower land 150. The recesses 144 and 150 are designed to mate when the earhook is in its stowed/collapsed position, such as in FIG. 12. Recesses 144 and lands 150 have sloping walls so that, when bias pressure is applied to the securing parts 23, the natural tendency is to rotate the earhook toward its stowed position. This bias force is achieved by the inherent tension in the materials in the earhook and the fact that the securing portions are spaced such that they are in a relaxed state only when the lands and recesses 144, 150, are fully mated. Or alternatively stated, the bias force is greatest when the lands and recesses are not fully mated because this causes a spreading of the spacing between the securing parts 23 and the material naturally resists this extension.

Boom 2 is similarly constructed to be maintained in a closed position, but also in a fully open position. This construction can be fully understood from FIGS. 13, 18–21, and 27.

Figure 13:
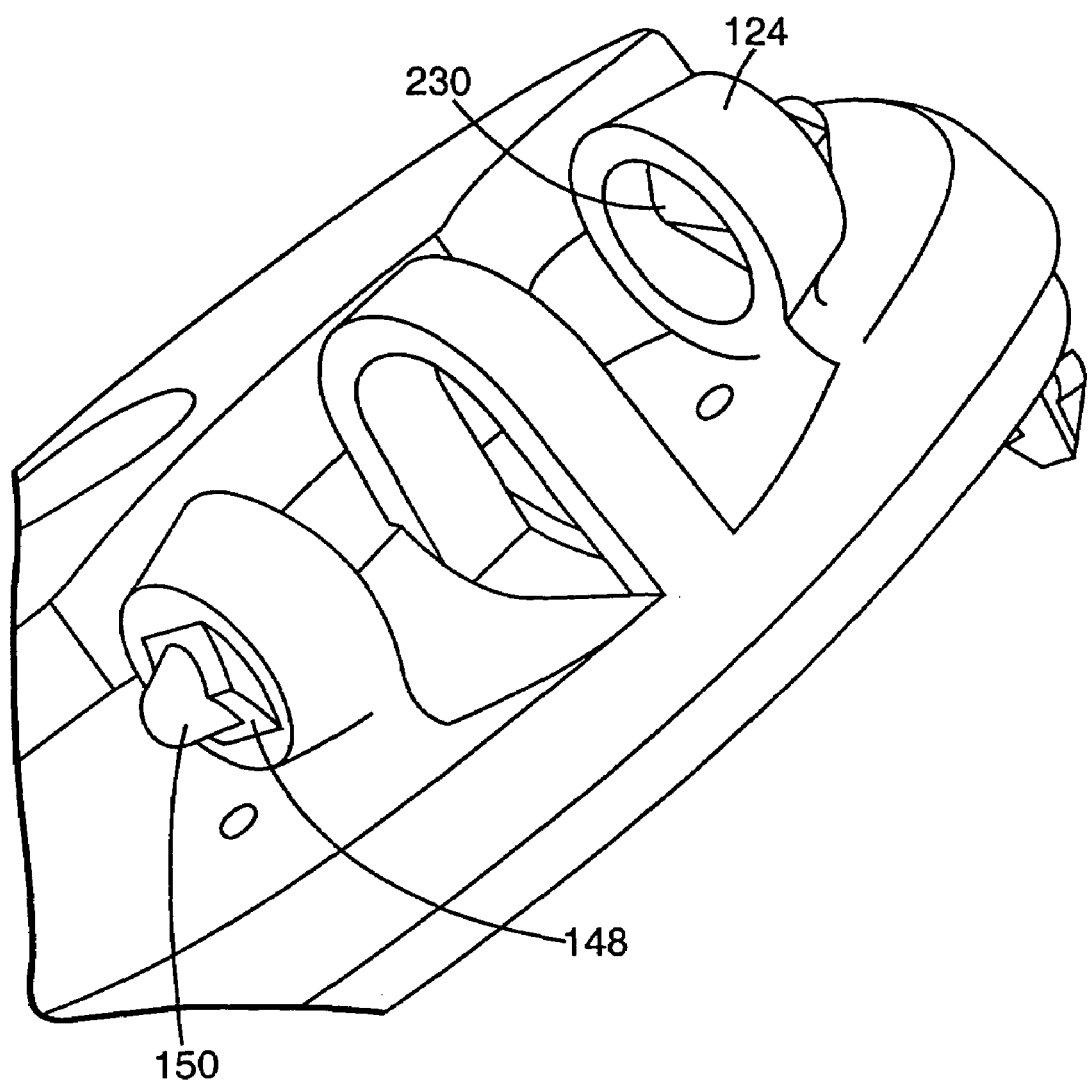
FIG. 13 is a close up perspective view with portion removed and broken away of the hinge shown in FIG. 12.
Figure 14:
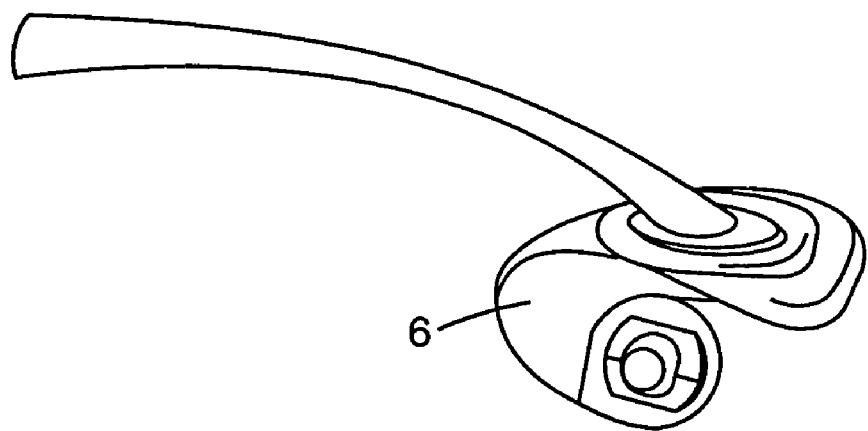
FIG. 14 is a top partial perspective view, of the earhook in FIG. 12.
Figure 15:
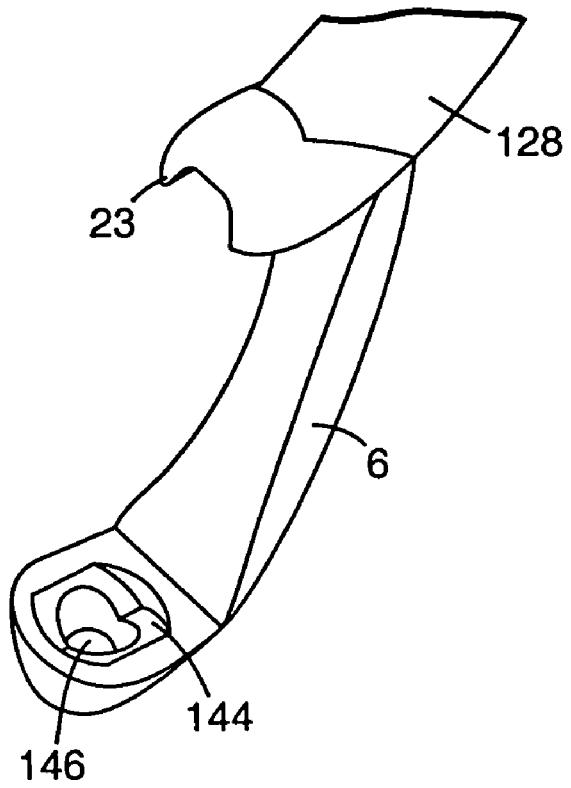
FIG. 15 is a close up partial perspective view, of the earhook in FIG. 14.
Figure 18:
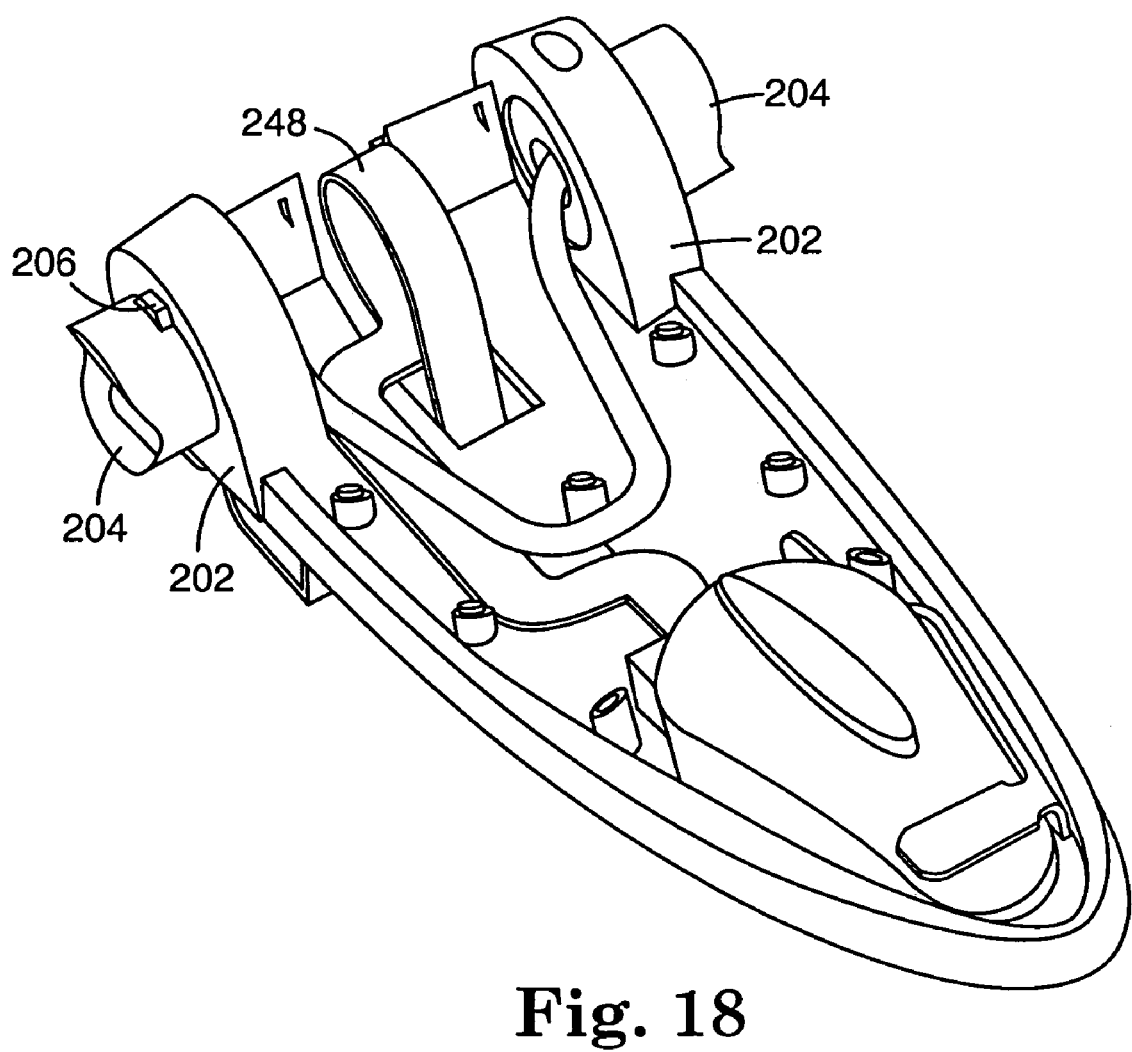
FIG. 18 is a perspective view, with portions removed, of the inside bottom portion of the microphone boom of FIG. 12.
Figure 27:
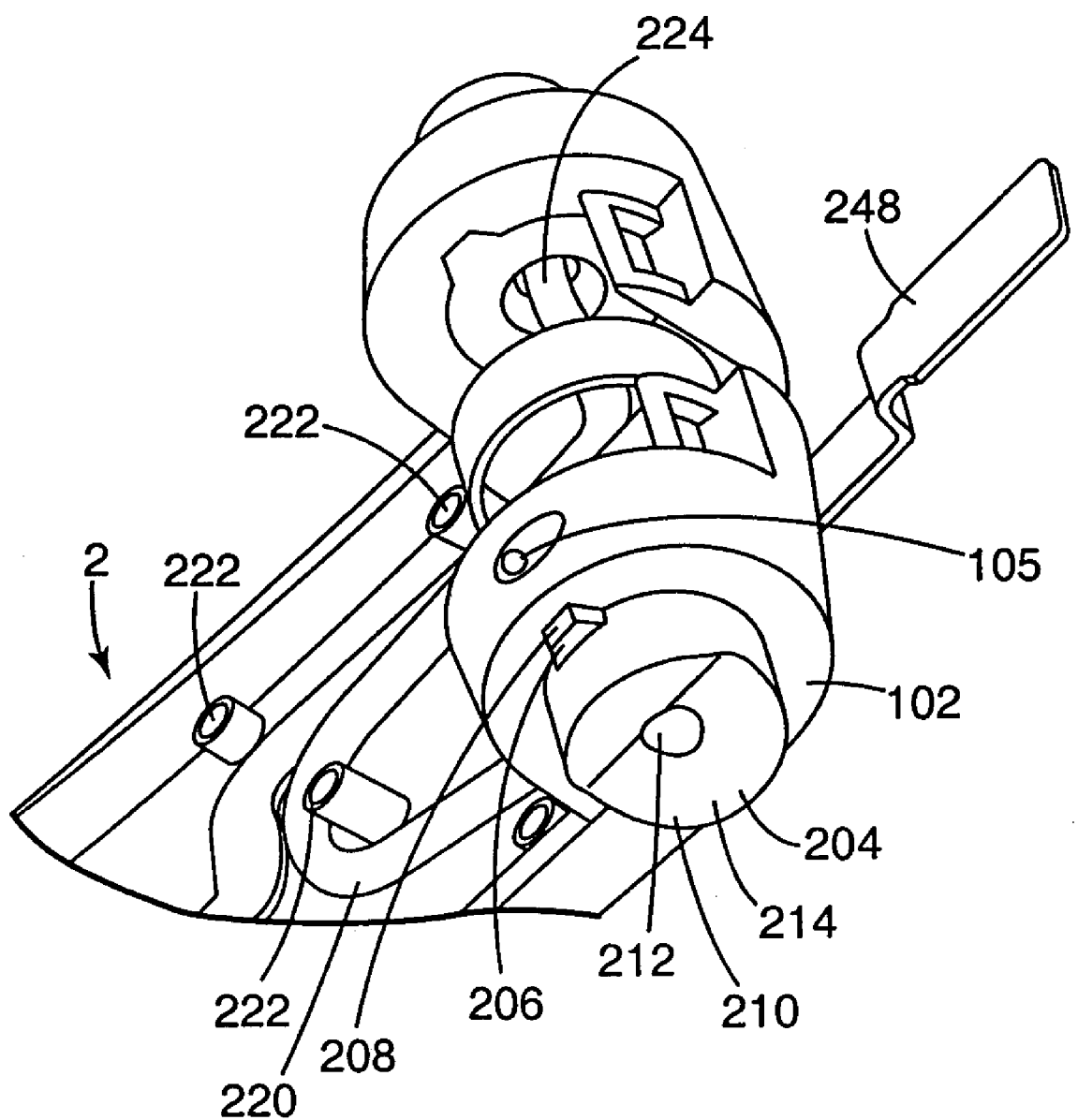
FIG. 27 is a close up perspective view with portions removed of the detent/detector for the boom, in another embodiment.

FIG. 13 illustrates the hinges 124 which are fitted on the outside with pins 148 and sloping lands 150 described above. In the recess of aperature 200 (FIG. 13) is a pair of sloping lands and a depression which are the reverse image of lands 148 and pin 150. They are designed to mate with components on the boom as indicated below. An outline of the cross section of the hinges 124 is shown over the FIG. 18 and particularly FIG. 27 shows, in close up, the inner structure of boom 2. In FIG. 18 there can be seen hinges 202 which have apertures for receiving stems 204, each having a projection 206 (see FIG. 27) to mate with a keyway 208 in the apertures. The keyway/projection system prevents rotation of the stems 204, which is important with respect to is operation. On the outward ends 210 of the stems, a recess 212 and v-shaped sloping opposed walls 214 can be seen converging at a center point. The v-shape and depress is size to generally mate with a like structure at the end of the opening 200 on the hinges 124 (FIG. 13).

Stems 204 are maintained in their outwardly biased position by spring force generated, in this case, by spring 220. Spring 220 is maintained in position on the inside of the boom by a series of posts 222 and have terminal ends. recesses 224 are provided in the inward ends of the stems and it can be seen how the bias force is applied.

In operation, the boom is maintained in its stowed position (FIG. 10) by the bias force tending to mate the lands. However, 180 degrees therefrom, in the open position (FIG. 9) the boom is likewise maintained because the lands mate with their counter part v-shaped walls 214 at their flattest point and thus the boom is maintained open by friction, but will collapse to the stowed position with slight urging.

Figure 19:
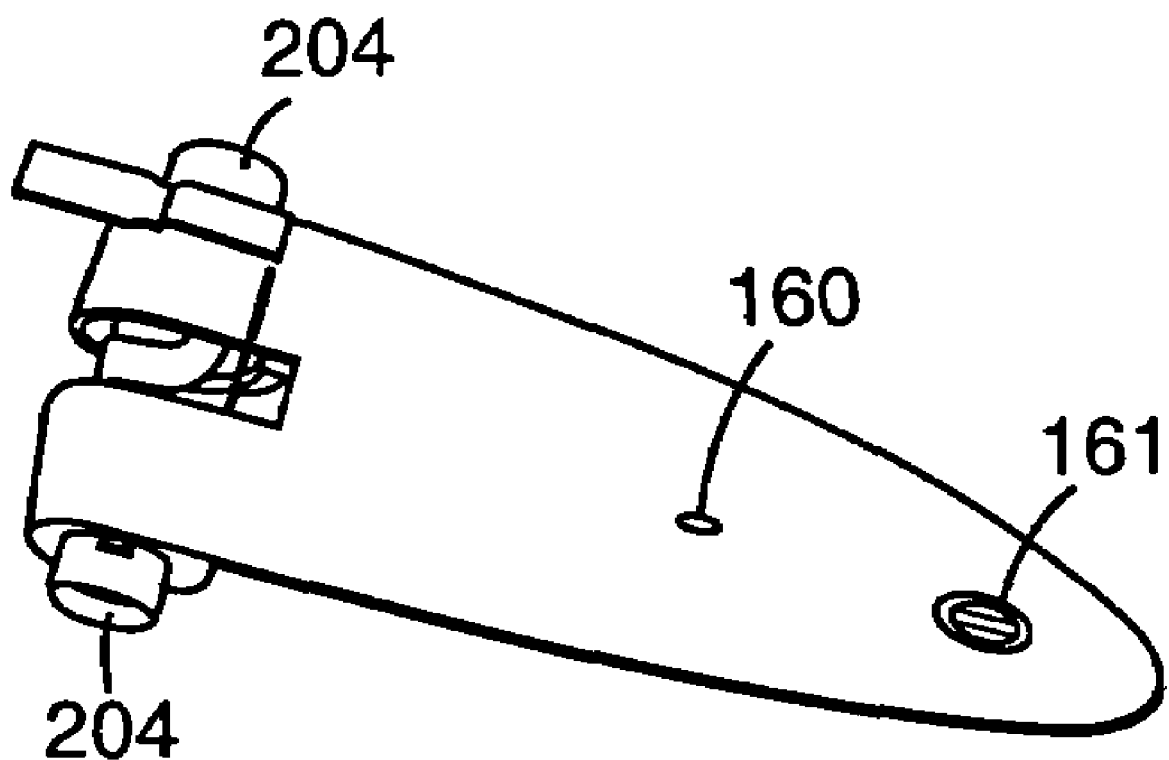
FIG. 19 is a perspective view, with portions removed of the boom in FIG. 12.
Figure 20:
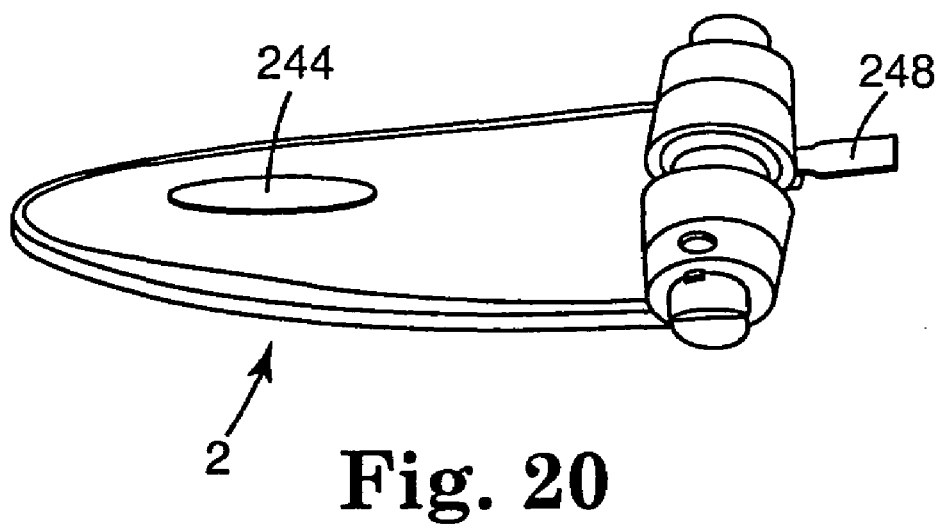
FIG. 20 is a perspective view life FIG. 19, except taken from the other side.
Figure 21:
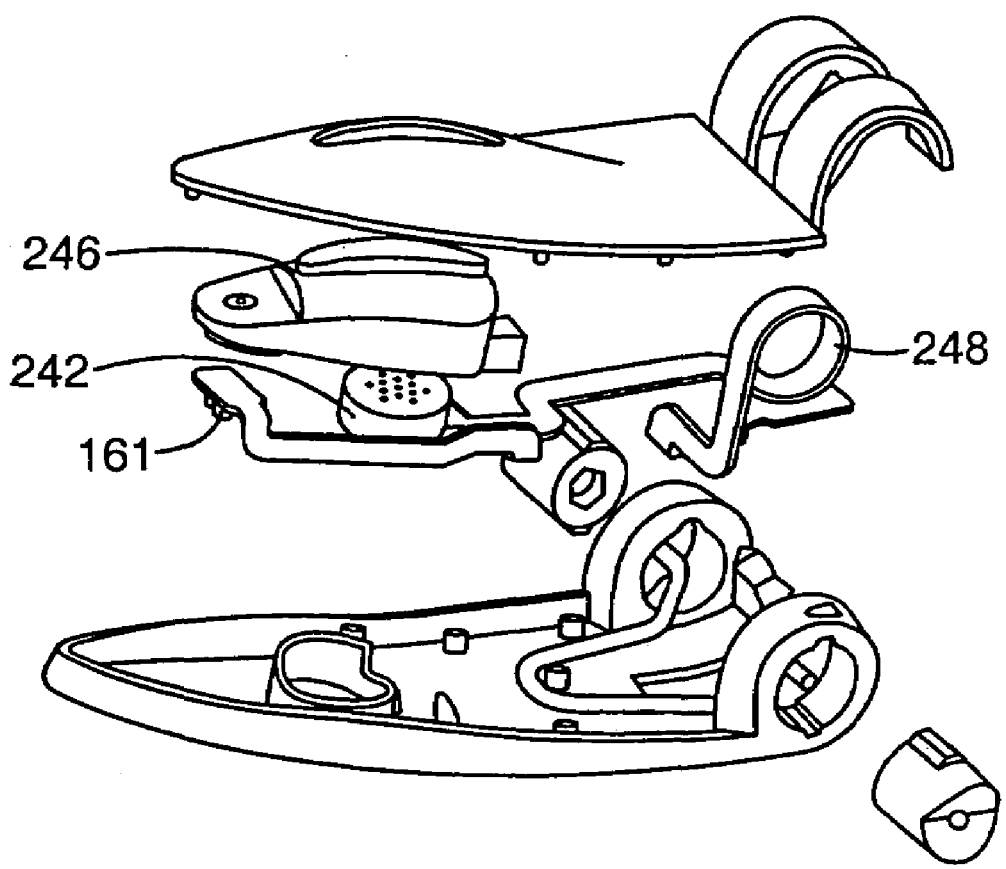
FIG. 21 is an exploded perspective view of the subject matter in FIGS. 18–20.

The inner construction of the boom 2 can also been seen from FIGS. 19–21.

On the outer side of the boom, a vent hole 160 situated to provide pressure relief for the acoustical pressure created when speaking in to the microphone 242 (FIG. 21) on the other side. On the same outward side of the boom is an illuminated display 161, preferably an led array capable of displaying multiple functions by flashing at different rates, or changing color or both.

On the inside surface of the boom 2 is a microphone inlet 244, which may also be provided with an illuminated ring or display. The microphone is spaced from the boom by a boot 246.

One means for providing electrical coupling from the microphone 242 and display 161 is by the use of a flexible circuit element or flea element 248. The element is configured to pass around and thru hinge 5 (FIGS. 1 and 25) in a manner shown also in FIG. 27. The flexibility of the element 248 does in impede the opening of the boom, yet provides a reliable, low resistance circuit path.

Finally, it is shown in FIG. 2 that in the depression 17 for the accommodation of the hinge part 5, an activating part 24 for a switch or contact can be placed, so that the position of the microphone arm 2 can be sensed, which will be explained later.

In FIGS. 3, 4, 5 and 6, the communication unit shown in FIG. 2 is shown in the assembled state and from various angles. As will be seen, the housing in this configuration is slightly oval when seen from the side, but it is obvious that other suitable configurations can be chosen, such as circular, egg-shaped, partly linear or compositions of these shapes. The essential factor in this connection is that the shape is such that the communication unit is easily stored, and such that the microphone arm 2 and the ear hook 6 can lie closely up against the housing.

Figure 5:
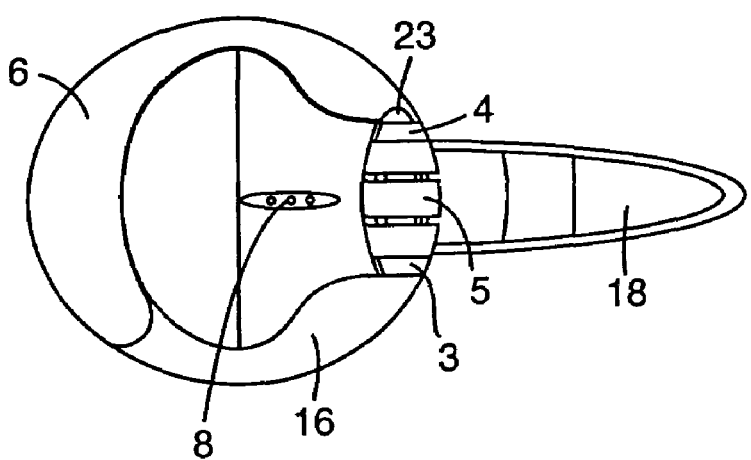
FIG. 5 shows the embodiment shown in FIG. 3 seen from the side.
Figure 4:
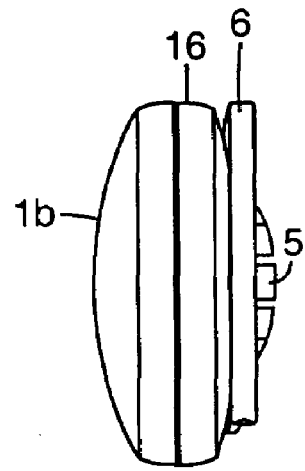
FIG. 4 shows the same embodiment seen from the rear.
Figure 6:
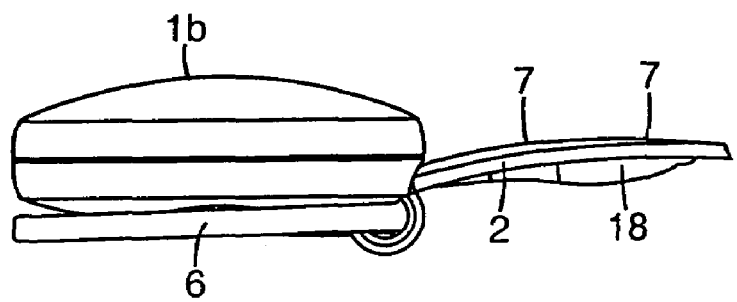
FIG. 6 shows the same embodiment seen from above.

As will be seen in FIGS. 4 and 5, the communication unit is relatively flat, and the compact configuration without projecting parts is retained when the ear hook 6 is turned into the recess 16, and when the microphone arm 2 is folded in against the side surface 1a of the housing 1. Due to its shape and its short length, in this position the microphone arm will lie closely up against the housing, so that the communication unit will have the shape of a capsule or the like which occupies only very little space, and which can easily be stored or transported in a bag, a pocket or the like.

In association with the microphone arm 2, resilient or similar mechanisms (not shown) can be established which can secure the microphone arm 2 in the fully folded-in and/or fully folded-out position, so that the microphone arm will normally remain in this or these positions during normal conditions of use.

The communication unit can be configured as an ordinary earset provided with an electrical connection, but can in particular be configured as a wireless unit which contains the necessary circuits and components, such as an antenna as mentioned, for the necessary communication with a base station, a telephone network, a mobile telephone, a PC or similar equipment, with which speech and sound are exchanged. By this communication, use can be made, for example, of known short-distance forms of communication, such as e.g. the so-called "Bluetooth" technology.

For use in a wireless manner, it is important to limit the current consumption, so that the built-in battery 15 can supply the communication unit with current for an adequate length of time between battery replacements or recharging. For this purpose, the activation part 24 discussed in connection with FIG. 2 can serve instead of or in addition to an ordinarily used switch (not shown) which can be placed on the housing 1, and which must be operated manually. The activation part 24 can thus serve to cause a disconnection of the current supply when the microphone arm 2 is folded in against the housing 1, and conversely to connect the current supply when the microphone arm is folded out when the communication unit is taken into use. It is hereby prevented that a commonly known switch, which can be placed e.g. on the housing, can be activated accidentally e.g. when the unit is placed in a pocket, whereby current will be consumed. Because of the length of the microphone arm and the way in which the arm is folded out, with the arrangement described an accidental connection can arise only when there is sufficient room in the relevant storage place for the microphone arm 2 to fold out.

Figure 26:
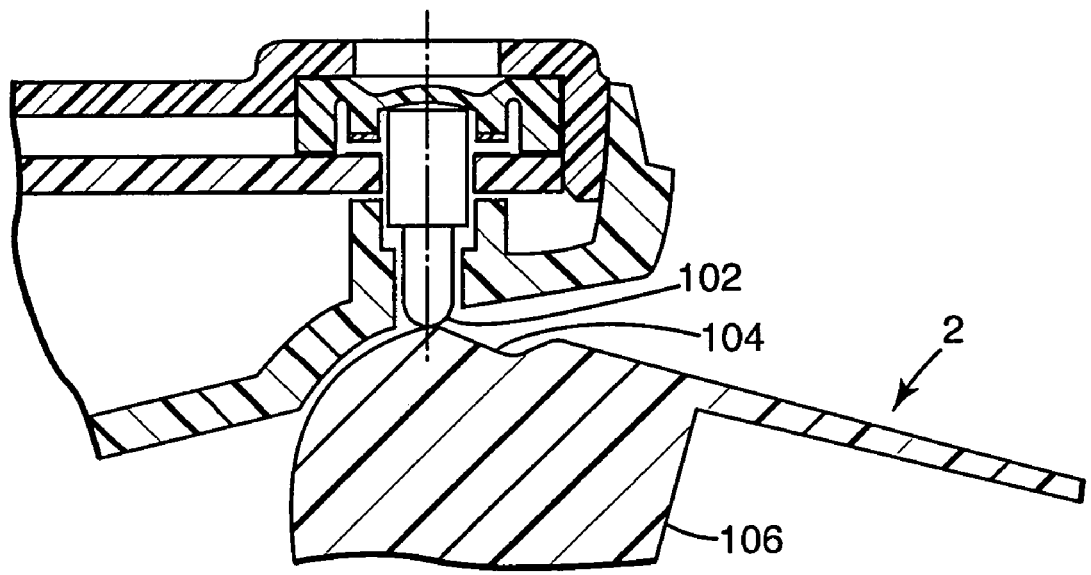
FIG. 26 is a close up view of the detent/detector for the boom, in one embodiment.

An alternative structure for saving power is shown in FIGS. 25–26. Situated in depression 17 (or elsewhere in contact with the boom 2, is a switch 102, which is shown as a pin and connected to the power circuitry as would be known to a person skilled in the art. The boom's 2 curved end 106 which attaches to the housing 1, has a detent portion 104 which can be a portion of smaller radius than the remaining portion of the curved end or a slot, hole or similar. It is only necessary that it be positioned such that the switch be activated when the boom is opened and only then. The switch 102 shown is activated when it's plunger is allowed to extend outwardly from the body 1 but this situation could be reversed so that it is actuated in the opposite manner, in which case the detent is the major portion of the curvature and what is shown as a detent 102 now, would have the full radius of the curved portion 106.

FIG. 26 shows an alternate construction where detent portion 104 is replaced with a slot or depression 105. This construction has a curved end 107 of even radius throughout.

It will be appreciated that many other means can be employed to detect the in-use status of the boom such as proximity detection of the location of the boom relative to the body.

Another use of this detection system is to power up the communications link with another Bluetooth device, most often a cellular phone handset. Software is provided to detect this "on" condition and wake up the cell phone and establish a link under the Bluetooth or other linking signal.

Furthermore, via this detection system, it is possible for the headset to inform another Bluetooth device, like a cell phone to go "off hook" and redirect voice signals thru the headset instead of the mic/speaker of the cell phone. Thus the user can merely open the boom 2 to answer a call without touching the cellphone at all.

In order to prevent an unintentional activation also in such a case, the unit can further be provided with a locking arrangement (not shown) which secures the microphone arm in the folded-in condition, e.g. against a spring effect. It is not until this locking arrangement is released, for example by means of a release button (not shown) that the microphone arm can be folded out to the position of use, possibly under the influence of a spring force. A connection of the current supply can hereby also be effected by means of the activation part 24. Alternatively, a connection of the current can be effected if at the same time the release button serves as a switch or serves to activate a switch, so that the connection of the current takes place at the same time as the releasing of the microphone arm. The microphone arm can also be provided with a spring device, which seeks to retain the microphone arm in one of two stable positions, i.e. in the fully folded-in and the fully folded-out condition. Consequently, when the microphone arm is to be folded-out or folded-in, the user must first move it against a suitable spring force which possibly increases until an unstable position is reached, from which during the further movement the microphone arm will be moved completely or partly by a spring force, which will bring the microphone arm to the second of the stable conditions, and vice versa. Also with this embodiment, which can be effected by means of commonly known arrangements, the microphone arm will thus be locked or secured against unintentional movement of the arm away from the inactivated condition.

It will be obvious that the extent of the forces which have to be overcome in the folding-out and/or -in of the microphone arm 2 must be selected while taking into account the finger strength of the normal user, so that the operation can be effected without difficulty, but at the same time so that an unintentional folding-out or -in will not take place during normal conditions of use.

Figure 22:
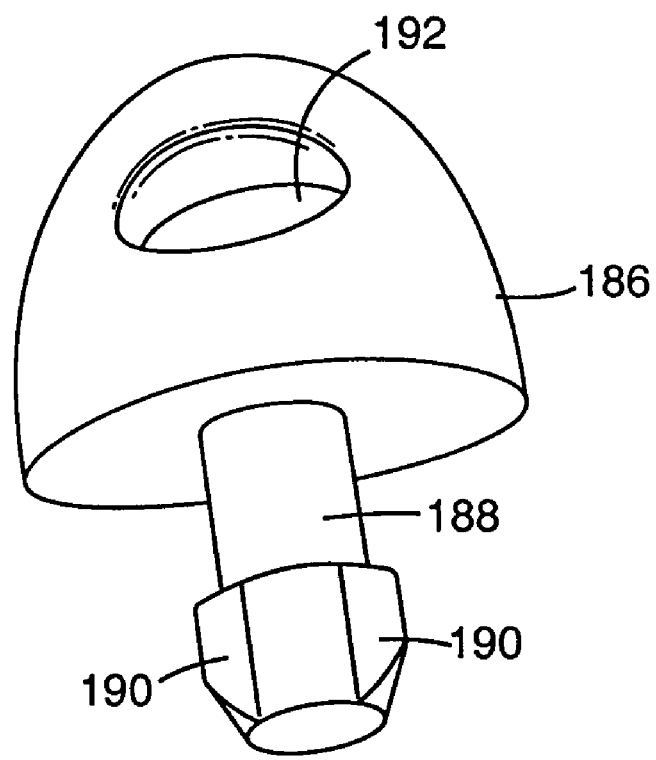
FIG. 22 is a perspective view of an anchoring pin for the lanyard.
Figure 23:
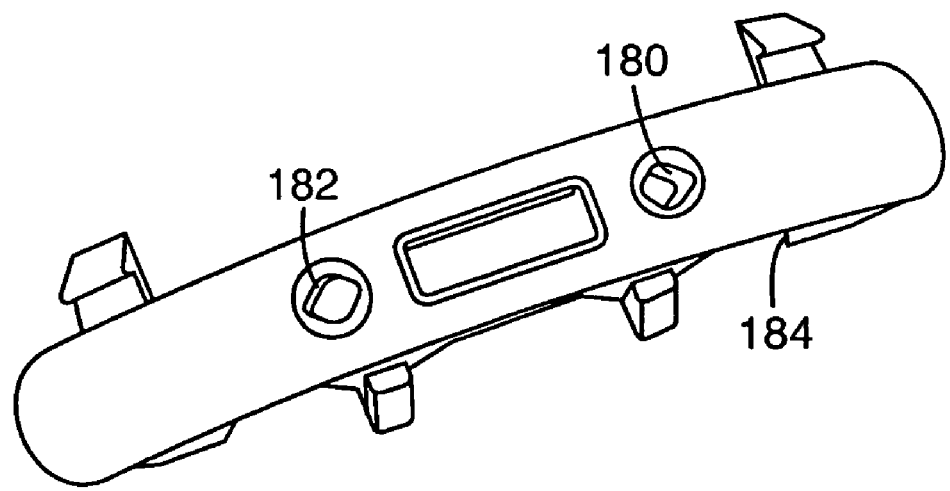
FIG. 23 is a perspective view of the mounting plate for the lanyard anchoring pin.

To avoid losing the headset when it is off the users ear is a system for attaching a lanyard (neck loop) not show. The body 1 includes at least on connecting point 180, 182 (FIG. 23 and FIG. 11) in plate 184. Plate 184 is located on the back side of the housing 1 (FIG. 11) but its location can vary. The connecting points 180–182 have generally circular openings but have at least one keyway which will mate with the teeth 190 of Pin 186 (FIG. 22). Pin 186 includes an aperture 192 for a neckstrap (not shown) a stem 188 and at least one tooth 190. The pin is thus inserted into the connecting point with keyway alligned and then the pin is turn to prevent withdrawal. By sizing the openings 180–182 just smaller than the stem 188, accidental rotational movement of the pin is prevented and the lanyard will not fall out. Alternative means for securing a lanyard are possible with the ease of removal (quick release) being of greatest importance.

It will be obvious to those familiar with the art that embodiments other than those shown and described can be considered, and that these embodiments will lie within the scope of the subsequent claims.

It will thus be obvious that the communication unit can be used for other than wireless purposes, where a cable link to the unit must thus be established. Moreover, it is obvious that use can be made of means other than an ear hook for the fastening of the communication unit to the head of a user, in that e.g. an ear ring or a headband can be used, merely providing that these parts can be folded in against the housing when the unit is not in use.

Finally, it is obvious that the parts, which constitute the communication unit, can be conFigure d from materials suitable for the purpose, such as synthetic and plastic materials, and that certain parts can be made of suitable metals.

What is claimed is:

1. A wearable headset communication unit comprising a housing, a reversible earhook pivotally attached to said housing and, capable of reversing between left and right wearing positions, function switches on said housing for adjusting features of the unit's performance, a detector for detecting the position of said earhook, circuitry responsive to said detector for changing the operation of said function switches in response to detection of whether the earhook is on the wearer's right or left ear and wherein said function switch include upper and lower switches, and wherein the function of said upper switch is swapped with said lower switch when said earhook is switched from right to left ear usage.

2. A headset according to claim 1 wherein said function switch include upper and lower switches, and wherein the function of said upper switch is swapped with said lower switch when said earhook is switched from right to left ear usage in response to detection of the orientation of the earhook.

3. A headset according to claim 1 wherein said detector includes a switch in said housing for detecting the presence of a portion of the earhook and wherein said earhook is configured to actuate said switch when configured for one ear and not actuate said switch when configured for the other ear.

4. A headset according to claim 1 where body include a hinge and wherein said earhook includes first and second portions which rotatably engage said hinge and wherein said first portion is configured to actuate said detector when said earhook is positioned for use on one of wearer's ears, but not the other, so that said upper and lower switches retain their same function even when their positioned are reversed when the wearer reverses said earhook from right to left usage.

5. A headset according to claim 2 wherein said detector is a switch in said housing and wherein said first portion of said earhook actuates said switch when used on wearer's one ear and not when used on wearer's other ear, and wherein said first and second portions of said earhook which engage said hinge are non-symmetrical and wherein detector is configured to engage said first portion when said earhook is engaged on said hinges for user's one ear and to not engage said second portion when said earhook is engaged on said hinges for user's other ear.

6. A wearable headset communication unit comprising a housing, a reversible earhook pivotally attached to said housing and, capable of reversing between left and right wearing positions, function switches on said housing for adjusting features of the unit's performance, a detector for detecting the position of said earhook, circuitry responsive to said detector for changing the operation of said function switches in response to detection of whether the earhook is on the wearer's right or left ear and wherein said function switch include upper and lower switches, wherein said the function of said upper switch is swapped with said lower switch when said earhook is switched from right to left ear usage ; and wherein said housing includes a hinge and said earhook includes first and second portions engaging said hinge, said portions being asymmetrical with respect to each other; and and wherein said detector includes means for detecting the asymmetry between said portions, so that said detector can detect whether said earhook is configured for user's left or right ear.

7. A wearable headset communication unit comprising a housing, a reversible earhook pivotally attached to said housing and, capable of reversing orientations of said earhook between left and right wearing positions, function switches on said housing for adjusting features of the unit's performance, means responsive to the orientation of said earhook for detecting whether said earhook is configured for user's left or right ear; and circuitry responsive to said detector for changing the operation of said function switches in response to detection said earhook orientation.

* * * * *